(12) United States Patent
Boydstun, IV et al.

(10) Patent No.: US 7,025,547 B2
(45) Date of Patent: Apr. 11, 2006

(54) VEHICLE TRANSPORTER WITH SCREW ACTUATORS

(75) Inventors: Robert D. Boydstun, IV, Clackamas, OR (US); John Thomas Huey, Milwaukie, OR (US); Mike David Barnes, Cornelius, OR (US); Paul Joseph Heger, Portland, OR (US); Bert Edward Bailiff, Vancouver, WA (US)

(73) Assignee: Boydstun Metal Works, Inc., Portland, OR (US)

( * ) Notice: Subject to any disclaimer, the term of this patent is extended or adjusted under 35 U.S.C. 154(b) by 23 days.

(21) Appl. No.: 10/812,748

(22) Filed: Mar. 29, 2004

(65) Prior Publication Data

US 2005/0214092 A1    Sep. 29, 2005

(51) Int. Cl.
*B60P 3/08* (2006.01)
(52) U.S. Cl. .................................................. 410/26
(58) Field of Classification Search ................ 410/26, 410/24, 4, 3
See application file for complete search history.

(56) References Cited

U.S. PATENT DOCUMENTS

| | | |
|---|---|---|
| 1,892,589 A | 12/1932 | Snyder |
| 2,492,829 A | 12/1949 | Baker |
| 2,934,319 A | 4/1960 | Wahlstrom |
| 3,084,970 A | 4/1963 | Day |
| 3,690,717 A | 9/1972 | Taylor |
| 3,880,457 A | 4/1975 | James, Jr. |
| 4,081,196 A | 3/1978 | Dandridge, Jr. |
| 4,221,422 A | 9/1980 | Harold |
| 4,267,901 A | 5/1981 | Tsujimura |
| 4,296,691 A | 10/1981 | Lohr |
| 4,369,008 A | 1/1983 | Cooper |
| 4,455,119 A | 6/1984 | Smith |
| 4,582,500 A | 4/1986 | Hanson et al. |
| 4,609,179 A | 9/1986 | Chern et al. |
| 4,624,188 A | 11/1986 | Kaleta |
| 4,701,086 A | 10/1987 | Thorndyke |
| 4,759,668 A | 7/1988 | Larsen et al. |
| 4,786,222 A | 11/1988 | Blodgett |
| 4,792,268 A | 12/1988 | Smith |
| 4,822,222 A | 4/1989 | Zeuner et al. |
| 4,911,590 A | 3/1990 | Green |
| 4,919,582 A | 4/1990 | Bates et al. |
| 4,921,218 A | 5/1990 | Andre |
| 4,964,767 A | 10/1990 | Leitz |
| 4,992,013 A | 2/1991 | Westerdale |
| 5,051,046 A | 9/1991 | Oren |
| 5,067,862 A * | 11/1991 | Andre .................. 410/26 |
| 5,071,298 A | 12/1991 | Conzett |
| 5,078,560 A | 1/1992 | Patrick et al. |
| 5,080,541 A | 1/1992 | Andre |
| 5,213,458 A | 5/1993 | Preller et al. |
| 5,297,908 A | 3/1994 | Knott |
| 5,322,003 A | 6/1994 | Winyard et al. |
| 5,429,474 A | 7/1995 | Knott |

(Continued)

FOREIGN PATENT DOCUMENTS

DE    1 134 334    10/1958

(Continued)

*Primary Examiner*—H. Gutman
(74) *Attorney, Agent, or Firm*—Chernoff, Vilhauer, McClung & Stenzel, LLP

(57) ABSTRACT

Vehicular cargo of a vehicle transporter is supported by elongate vehicle support members. Elevated vehicle support members are supported above the vehicular frame of the transporter and moved by screw actuators that are self-locking.

29 Claims, 11 Drawing Sheets

U.S. PATENT DOCUMENTS

| | | |
|---|---|---|
| 5,595,465 A | 1/1997 | Knott |
| 5,702,222 A | 12/1997 | Rosen |
| 5,755,540 A | 5/1998 | Bushnell |
| 5,937,972 A | 8/1999 | Andre |
| 5,938,382 A * | 8/1999 | Andre et al. .................. 410/24 |
| 6,142,447 A | 11/2000 | Jean-Luc et al. |
| 6,171,036 B1 | 1/2001 | Boydstun, IV et al. |
| 6,572,312 B1 | 6/2003 | Cottrell |
| 6,575,678 B1 * | 6/2003 | Cottrell ..................... 410/29.1 |
| 2002/0051692 A1 * | 5/2002 | Cottrell ..................... 410/26 |
| 2002/0192063 A1 | 12/2002 | Fluke, Jr. |
| 2003/0132014 A1 | 7/2003 | Marshall |
| 2005/0042055 A1 * | 2/2005 | Weir .......................... 410/26 |

FOREIGN PATENT DOCUMENTS

| | | |
|---|---|---|
| DE | 3147591 A1 | 12/1981 |
| DE | 3920323 C2 | 6/1989 |
| EP | 0 001 364 | 4/1979 |
| EP | 0 518 795 B1 | 4/1996 |
| FR | 72.14936 | 11/1973 |
| GB | 927361 | 5/1963 |
| WO | WO 90/05043 | 5/1990 |

\* cited by examiner

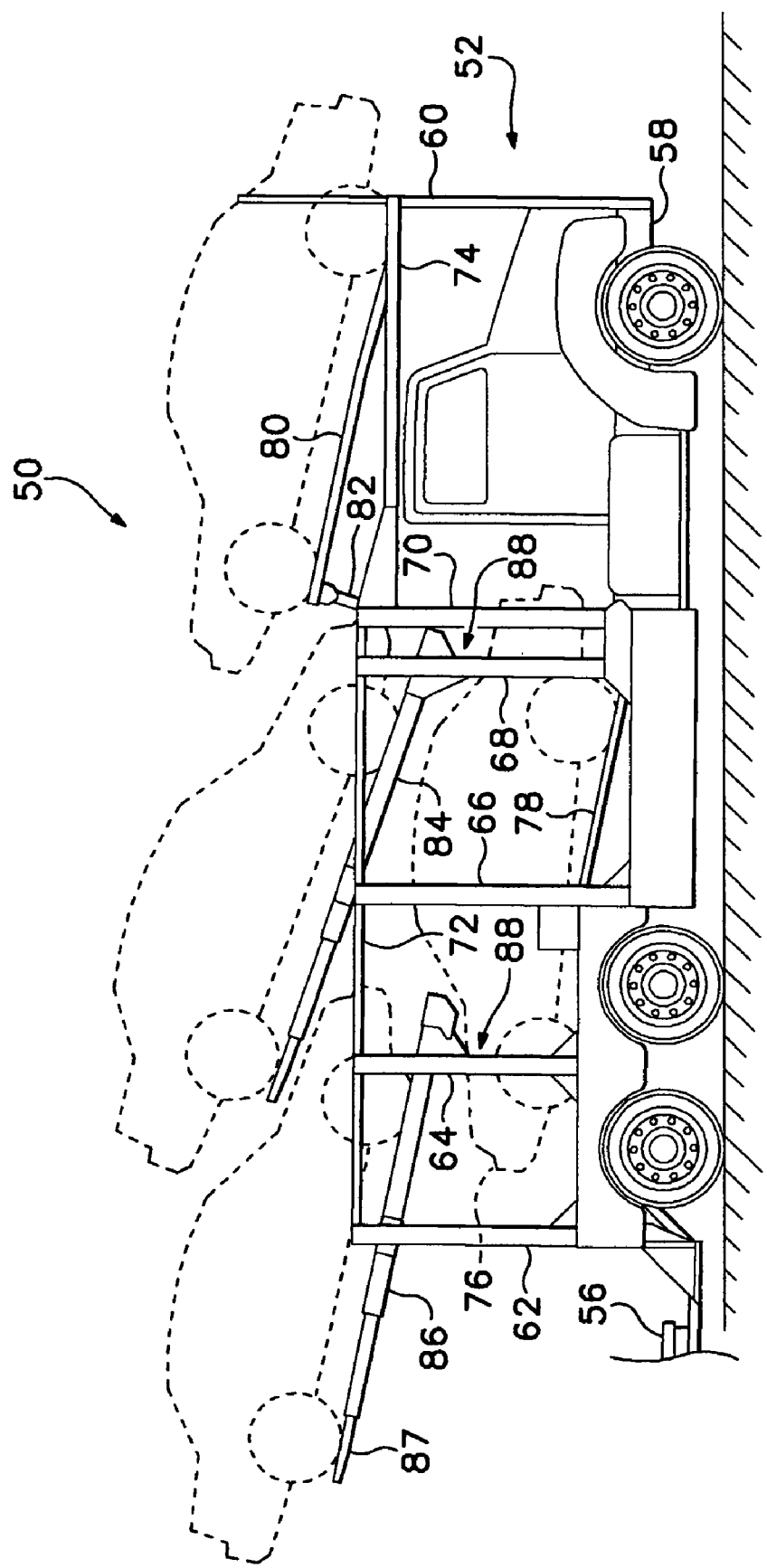

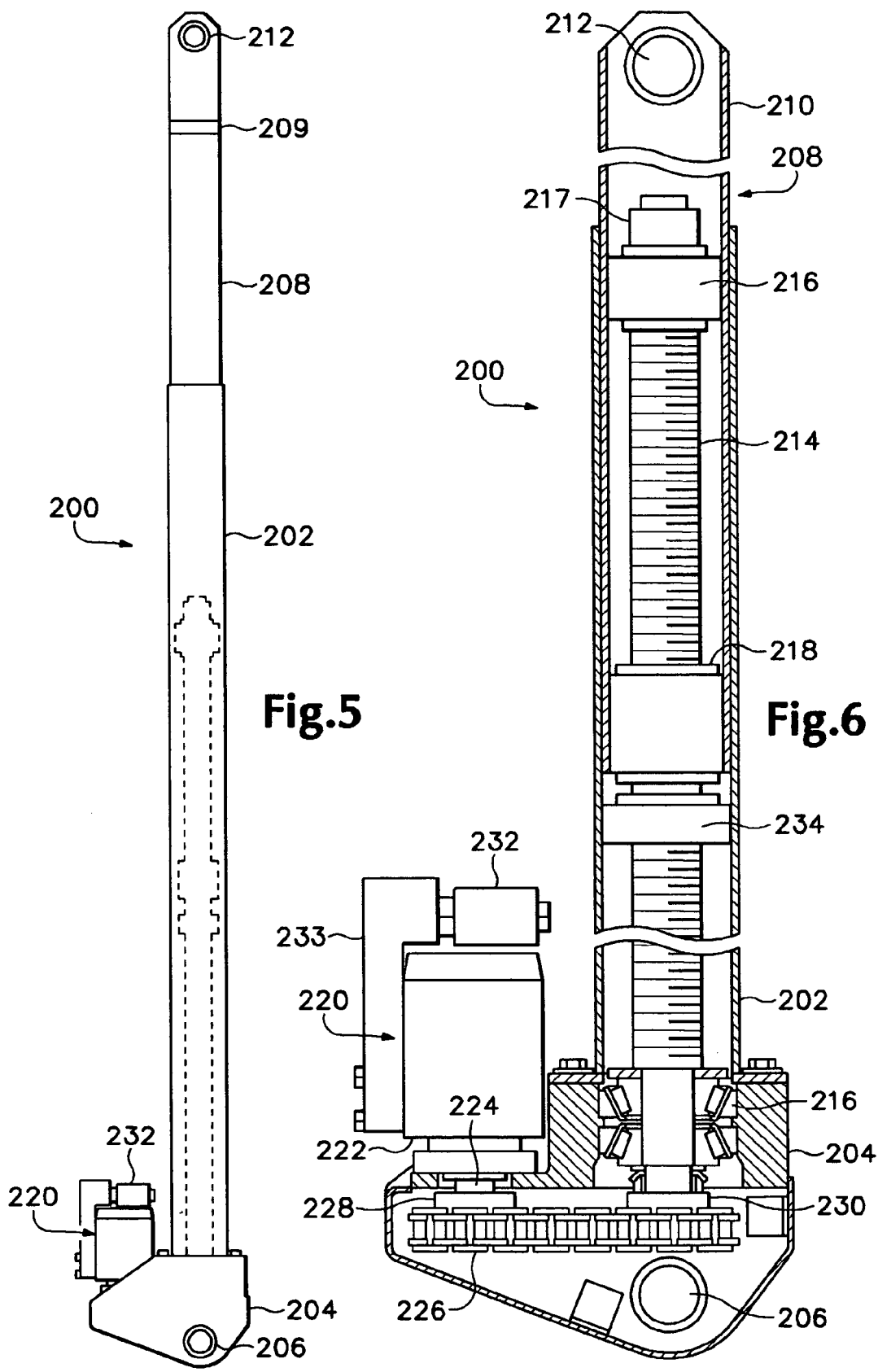

VEHICLE TRANSPORTER WITH SCREW ACTUATORS

CROSS-REFERENCE TO RELATED APPLICATIONS

Not applicable.

BACKGROUND OF THE INVENTION

The present invention relates to vehicle transporters, such as trucks, trailers, and the like, that have vehicle support members movable relative to the frame of the transport vehicle and, more particularly, to a vehicle transporter having a vehicle support member movable by a screw actuator.

Vehicle transporters are normally equipped with elongate vehicle support members to engage and support the wheels of the vehicles comprising the cargo. The vehicle support members may be fixed to the vehicular frame of the vehicle transporter, but are often movable relative to the vehicular frame to permit orienting the cargo vehicles so that the payload can be maximized and the height of the transporter reduced to satisfy legal requirements and to clear overpasses and other obstacles. The movable vehicle support members can also be positioned to form a surface over which cargo vehicles can be driven during loading and unloading.

The movable vehicle support members are, typically, moved by means of elongate hydraulic cylinder assemblies connecting the vehicular frame and the vehicle support members. However, a significant drawback of such transporters is the time required to mechanically lock each hydraulic cylinder assembly in position when the transporter is loaded and unlock each cylinder assembly so that the associated vehicle support members can be repositioned during loading and unloading. Mechanical locking is important to maintain the position of a vehicle support member in the event that the hydraulic cylinder assembly does not continue to support the load due to a broken fluid supply line, seal failure, leakage, inadvertent control actuation, or some other reason. This task typically requires the manual insertion or removal of a pin at each of the hydraulic cylinder assemblies. Since a vehicle transporter may have 16 or more pairs of hydraulic cylinders, half of which are typically located on each side of the vehicle transporter's frame, correctly positioning the hydraulic cylinders and manually locking or unlocking each cylinder is very time consuming.

Andre et al., U.S. Pat. No. 5,938,382, disclose the use of screw drives for positioning vehicle supporting members on an over-the-road vehicle transporter. Each vehicle supporting structure is supported by at least one pair of laterally spaced screw drives. The screw drives comprise a powered screw supported in tension from its upper end in a substantially vertical hollow post. Each screw is rotated by a hydraulic motor having a shaft attached to the bottom of the screw and a case attached to the transporter's frame. A nut, that is captive in the post, is displaced along the screw when the screw is rotated by a motor attached to the lower end of the screw. The cross-section of the post is a C-shaped channel and a portion of the nut projects through the gap in the channel section and is attached to a vehicle supporting member. The posts are fixed and, typically, substantially vertical to avoid side loads that might bend the screw or damage the motor bearings. The fixed, vertical posts complicate the connections to the vehicle supporting members which are often pivoted about one end to facilitate orienting the cargo vehicles to maximize the number carried by the transporter. In addition, the gap in the channel-shaped cross-section of the post exposes the screw and nut to the elements, including moisture and road salt, in the harsh over-the road environment.

To synchronize rotation of motors powering a pair of laterally spaced screws and, therefore, the translation of the movable nuts supporting a vehicle support structure, the motors are hydraulically connected in series so that the exhaust of the first motor is the supply for the second motor. Each motor is connectable to the reservoir and to the pump supplying pressurized fluid. Each motor is also connected to its paired motor by a fluid line extending across the transporter's frame. In addition, the supply and exhaust ports of each motor of the pair must be cross connected, through a pair of relief valves, to the ports of other motor so that leakage does not prevent one of the actuators from moving through the full range of motion. While a series fluid connection roughly synchronizes the operation of a pair of fluid actuators, each actuator must exhaust exactly the volume that is required to supply the other actuator or some circuitry must be provided to account for the difference increasing the number of valves, supply lines, and connections in the fluid supply and control system.

In the alternative, the paired hydraulic actuators can be connected in parallel. However, the movement of hydraulic actuators connected in parallel is not synchronized and the actuator experiencing the lowest pressure will move first and fastest. If the actuators are connected in parallel, a means must be provided to equalize the displacement of the actuators because differences in the internal construction of the actuators, friction or binding in the connections for the vehicle supporting structure, or side-to-side differences in the weight of the cargo vehicle commonly causes unequal displacement of the laterally spaced actuators of a pair of actuators supporting a vehicle supporting structure.

What is desired, therefore, is a self-locking actuator that is well protected from the environment and conveniently connectable to the various movable and stationary members of the structure of a vehicle transporter.

BRIEF DESCRITION OF THE DRAWINGS

FIG. 1A is a simplified elevation view of a truck unit of an exemplary embodiment of a vehicle transporter.

FIG. 5 is a side view of a partially extended first embodiment of an extendible screw actuator.

FIG. 6 is a cut-away view of the extendible screw actuator of FIG. 5.

DETAILED DESCRIPTION OF THE INVENTION

Figure 1B:
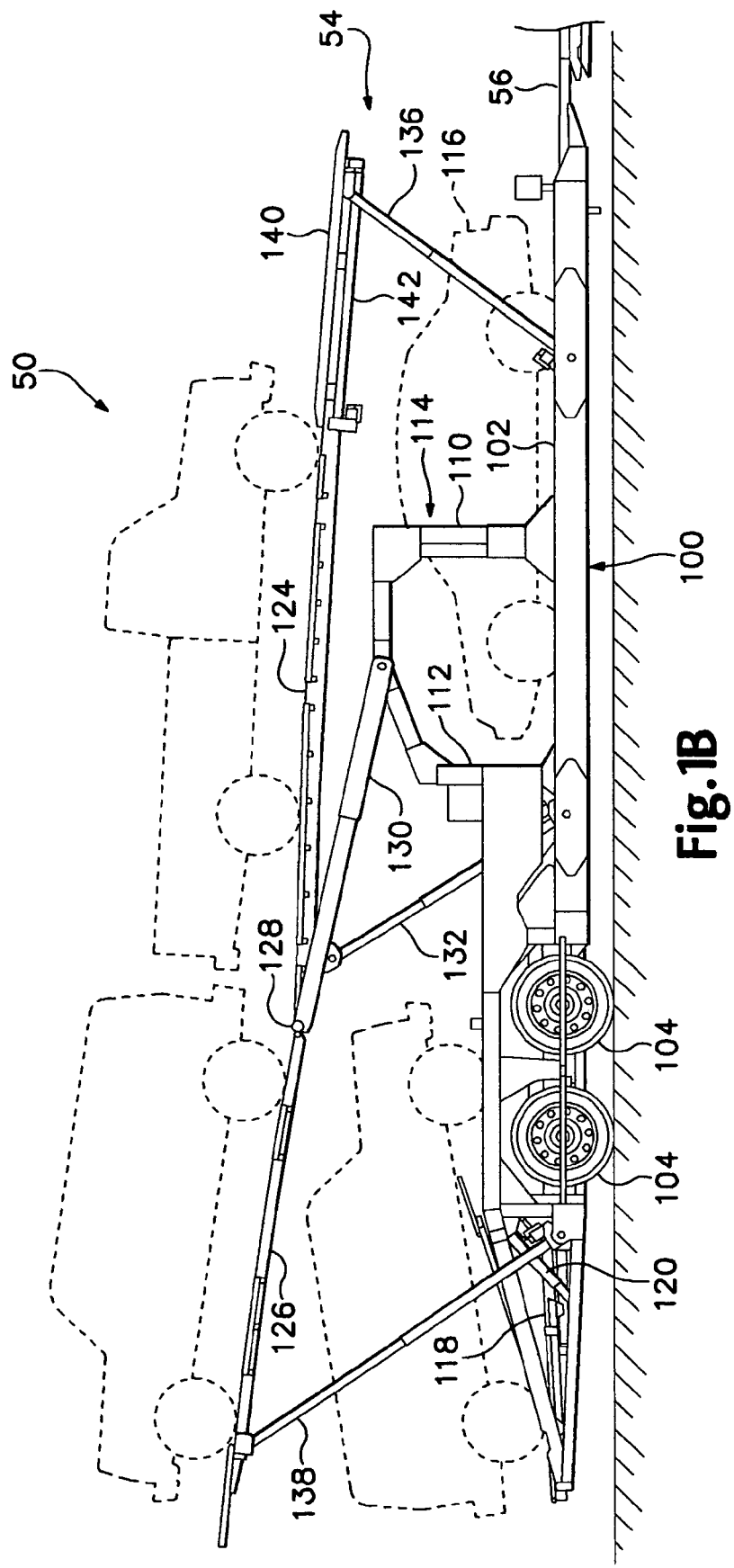
FIG. 1B is a simplified elevation view of a trailer unit of an exemplary embodiment of a vehicle transporter.

Referring in detail to the drawings where similar parts of the invention are identified by like reference numerals, and, more particularly, to FIGS. 1A and 1B, an exemplary vehicle transporter 50 comprises, generally, a truck unit 52 and a trailer unit 54 connected by a hitch 56. The truck unit 52 and the trailer unit 54 are each adapted to carry a plurality of automobiles or other vehicles as cargo. Both the truck 52 and the trailer 54 include a plurality of comparable, transversely spaced, vehicle support members spaced apart to support the wheels of the vehicles carried as cargo by the transporter. The truck unit 52 is preferably capable of transporting four or five vehicles depending upon their size and the trailer unit 54 is preferably equipped to transport a larger number of vehicles.

The truck unit 52 includes an elongate truck vehicular frame 58 with a plurality of posts 62, 64, 66, 68, 70 projecting upward along either side of the vehicular frame and interconnected at their tops by upper rails 72, 74. One or more cargo vehicles 76 can be supported on a lower tier of elongate vehicle support members 78 arranged along either side of the vehicular frame 58 and spaced to engage the wheels of the cargo vehicles. The vehicle support members 78 supporting the lower tier of vehicles may be fixed to the vehicular frame or movable relative to the frame.

The wheels of an upper tier of cargo vehicles are supported by comparable vehicle support members extending along the edges of the truck unit 52 and elevated above the vehicle support members 78 supporting the lower tier of cargo. While a vehicle support member for the upper tier of vehicles may be fixed relative to the truck vehicular frame 52, typically at least one end of a vehicle support member is movable relative to the vehicular frame. The spaced vehicle support members supporting the upper tier of cargo are commonly connected at, at least, one end so that a pair of vehicle support members is movable as a vehicle support structure. For example, a forward or first upper tier vehicle support structure 80 of the truck unit 52, comprising a vehicle support member on each side of the truck unit, is pivotally attached at its forward end to vertical posts 60 extending upward from either side of the vehicular frame 58. The rearward end of the first upper tier vehicle support structure 80 is pivotally attached to a first end of a link 82 that has a second end pivotally attached to an elongate hydraulic actuator arranged inside of the hollow vertical post 70.

Figure 9:
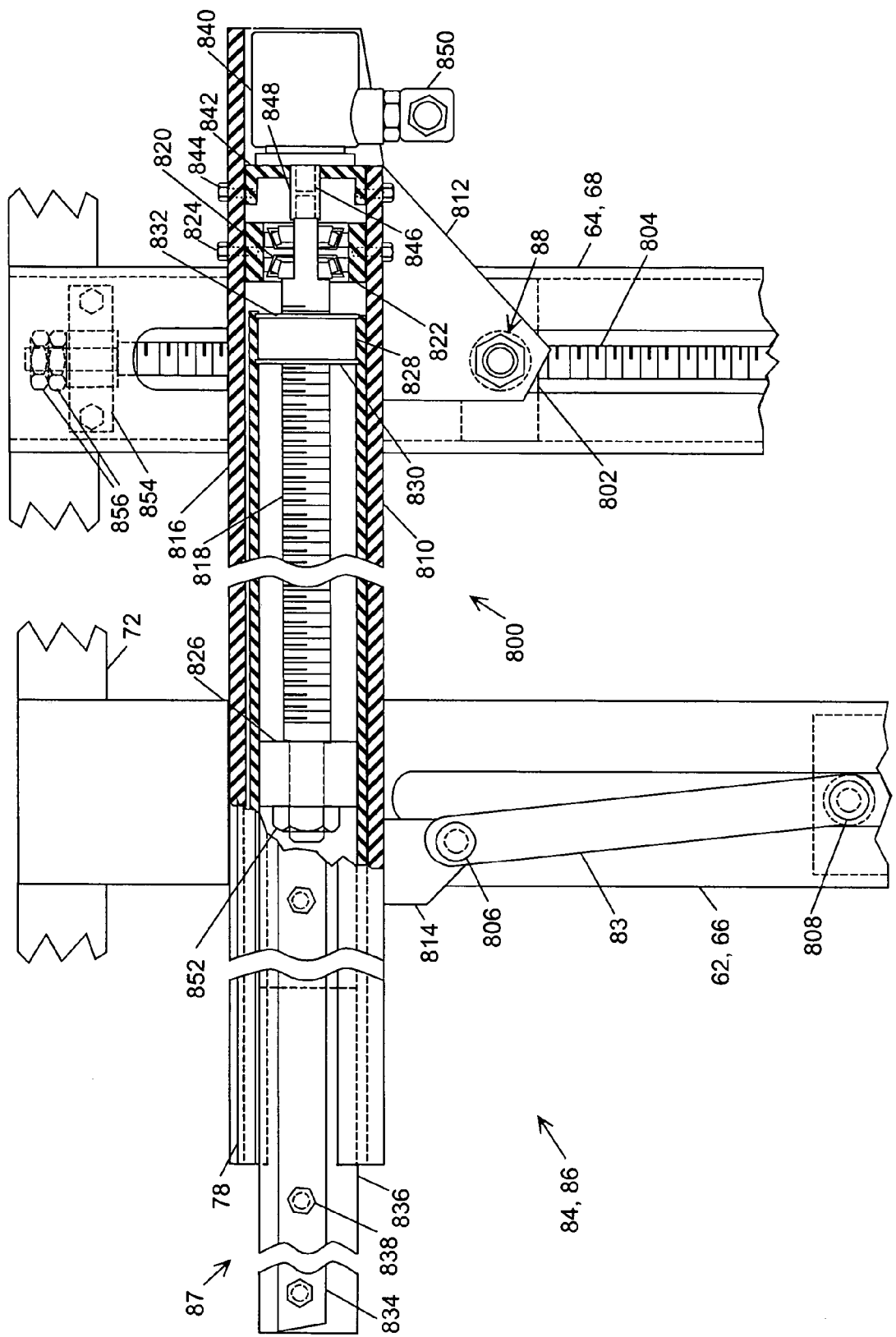
FIG. 9 is a partial cutaway, elevation view of a extendible vehicle support structure and a third embodiment of an extendible screw actuator viewed from the longitudinal centerline of the truck unit of a vehicle transporter.

Referring also to FIG. 9, second 84 and third 86 upper tier vehicle support structures of the truck unit 52 are attached at their forward ends by pivots 88 that are displaceable vertically relative to the truck's vehicular frame 58. The pivots 88 restrain movement of the vehicle support structures along the longitudinal axis of the truck unit 52 but permit the vehicle support structures 84, 86 to move vertically and rotate relative to the vehicular frame 58. The pivots 88 engage a vehicle support member of the respective vehicle support structure 84, 86 and an elongate hydraulic actuator located in the interior of the respective, hollow vertical post 64, 68 enables the pivot to be selectively raised or lowered and the vehicle supporting member to rotate about the pivot. The elongate hydraulic actuator may be a screw drive comprising a screw 804 suspended from a bearing block 854 by jam nuts 856 at the upper end and powered by a hydraulic motor (not illustrated) at the lower end. The pivot 88 includes a portion projecting through a slot in the post 64, 68 that is connected to a nut 802 in threaded engagement with the screw and slidable in the hollow post. When the screw is rotated, the nut 802 translates along the screw 802, raising or lowering the pivot 88. The ends of the second 84 and third 86 upper tier vehicle support structures nearer the rear of the truck unit 52 are each pivotally attached to a link 83 which is, in turn, pivotally attached to an elongate hydraulic actuator arranged in each of the respective vertical posts 62, 66. The pair of hydraulic actuators supporting a front or rear end of one of the second 84 and third 86 upper vehicle support structures may be extended or retracted to tilt the vehicle support structure. On the other hand, both of the pairs of actuators supporting a vehicle support structure may be extended or retracted to move the vehicle support structure vertically. Tilting the vehicle support structures permits a low profile portion, such as hood or trunk, of one vehicle to overlap a low profile portion a second vehicle in an adjacent position maximizing the number of vehicles in the cargo. By lowering and tilting the vehicles of the cargo after loading, the overall height of the transporter can be reduced to meet over-the-road legal requirements and provide clearance under bridges and other overhead obstructions. Loading and unloading may require raising the upper tier of vehicle support members to provide clearance for higher profile portions, such as the cabin, of the cargo vehicles of the lower tier. Tilting and displacing the vehicle support structures 80, 84, 86 permits the vehicle support members to be arranged as a continuous surface over which cargo vehicles can be driven during loading and unloading.

Figure 2:
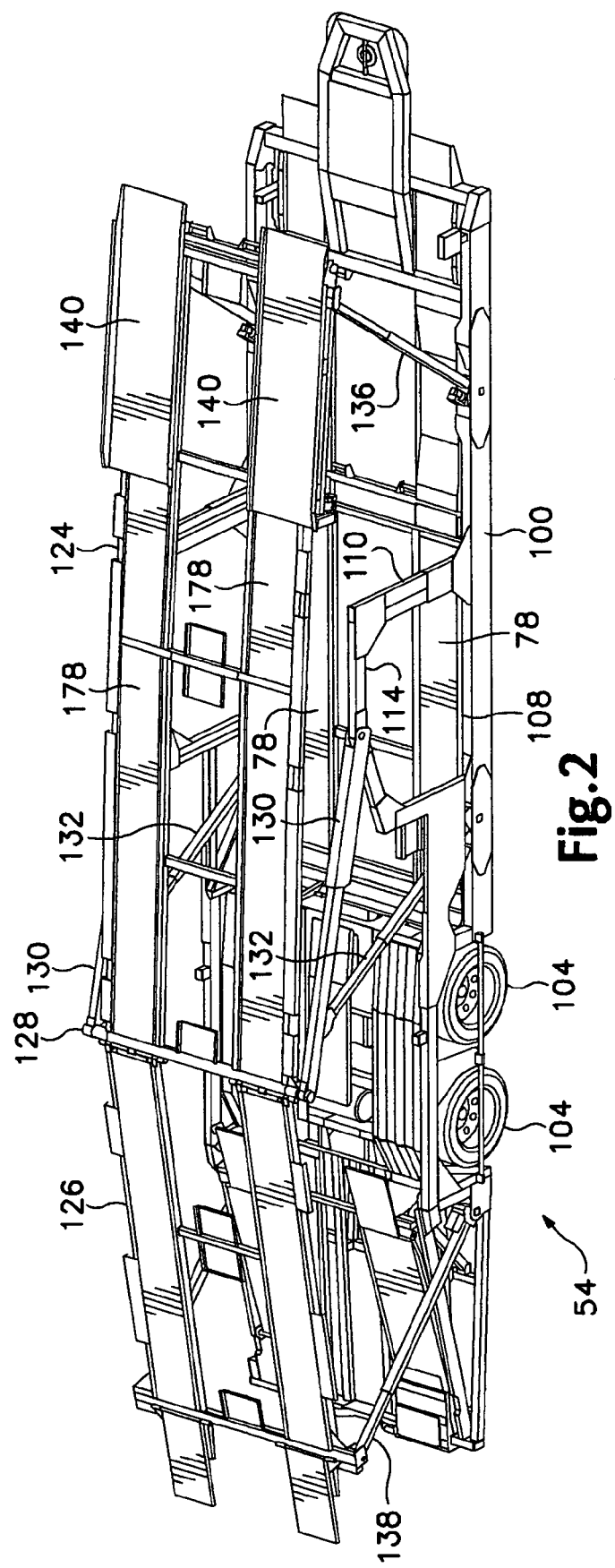
FIG. 2 is a perspective view of a trailer unit of an exemplary embodiment of a vehicle transporter.

Referring specifically to FIG. 1B and FIG. 2, the trailer unit 54 includes an elongate trailer vehicular frame 100 comprising, generally, transversely spaced, substantially horizontal frame beams 102 supported by a plurality of wheels 104 proximate the rear of the frame and the hitch 56 that connects the front of the trailer vehicular frame to the truck vehicular frame 58. The trailer unit 54 also includes transversely spaced vehicle support members 78 arranged along each side of trailer vehicular frame 100 to support the wheels of one or more vehicles in a lower tier of the cargo. While the vehicle support members 78 supporting the lower tier of vehicles may be fixed to the trailer's vehicular frame, in some cases the vehicle support members are movable relative to the frame. For example, a first lower tier vehicle support structure 108, including sections of vehicle support members 78, is pivotally and slidably attached to linear actuators within front 110 and rear 112 posts of a vertical frame 114 projecting upward at either side of the trailer vehicular frame 100. Extending and retracting actuators located inside the hollow front 110 and rear 112 posts permits the first lower tier vehicle support structure 108 to be raised to the level of the portions of the vehicle support members arranged over the wheels 104 of the trailer unit 54 to facilitate cargo loading and then lowered, as illustrated in FIG. 1B, to lower the profile of the cargo vehicle 116 and reduce the overall height of the trailer unit for travel.

Figure 4:
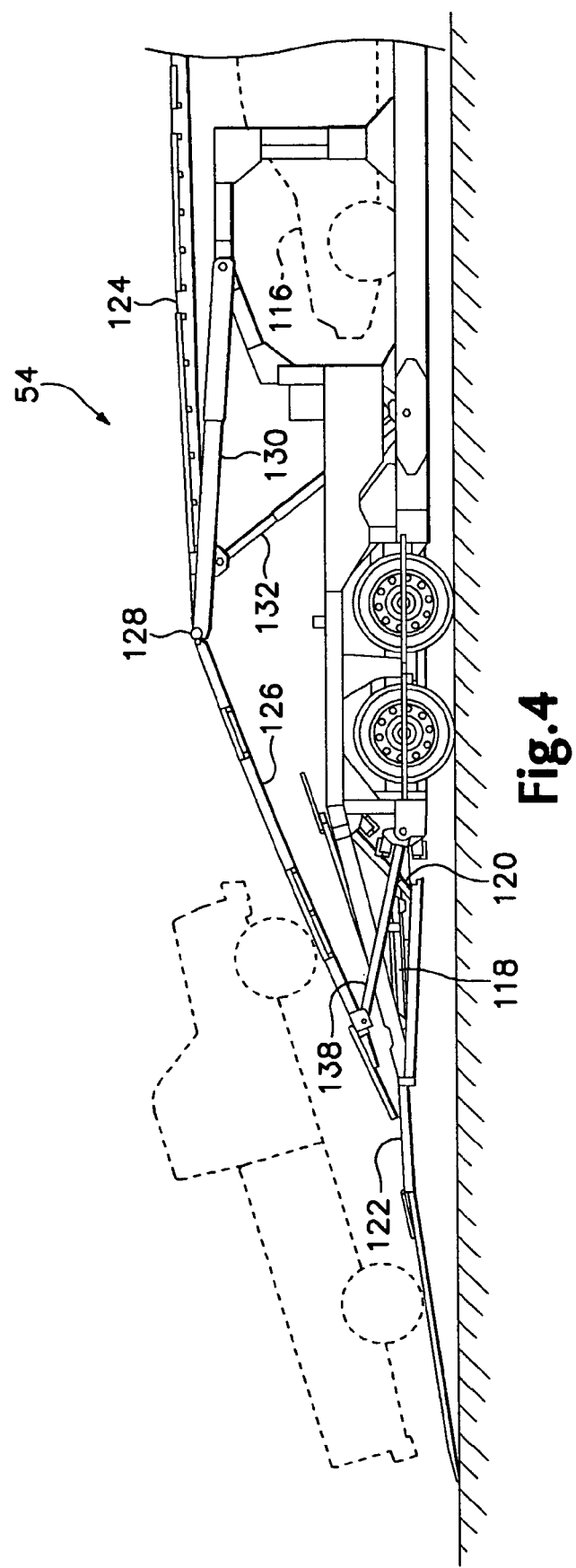
FIG. 4 is a simplified elevation view of a portion of the trailer unit of FIG. 1B with vehicle supporting members positioned to form a ramp from the ground to the upper tier of vehicle support members of the trailer unit.

Referring to FIG. 4, extendible screw actuators 118, 120 are arranged to translate vehicle support member sections 122 at the rear of the trailer unit 54 to form slide out skids permitting cargo vehicles to be driven onto the elevated vehicle support members of the trailer unit.

On the trailer unit 54, an upper tier of cargo vehicles is supported by an elevated, movable first upper tier vehicle support structure 124 and an elevated, movable second upper tier vehicle support structure 126. The adjacent ends of the first 124 and second 126 upper tier vehicle support structures, proximate the middle of the trailer 54, are connected to each other by a support structure pivot 128. A swing arm 130 is pivotally connected at one end to each of the vertical frames 114 at the side of the trailer vehicular frame 100 and pivotally connected at the second end to the support structure pivot 128 connecting the first 124 and second 126 upper tier vehicle support structures. An extendible, screw actuator 132 is pivotally connected to each of the swing arms 130 at one end and pivotally connected to the vehicular frame 100 at the second end. When the screw actuators 132 are extended, the support structure pivot 128 connecting the first 124 and second 126 upper tier vehicle support members will be moved upward and forward relative to the trailer vehicular frame 100 in an arc defined by the swing arms 130. On the other hand, when the screw actuators 132 are retracted, the support structure pivot 128 will move toward the rear and downward relative to the trailer vehicular frame 100.

The ends of the first 124 and second 126 upper tier vehicle support structures of the trailer unit 54 distal to the support structure pivot 128 are also supported above the frame by pairs of laterally spaced, extendible screw actuators 136, 138. If the support structure pivot 128 is held stationary, extending or retracting a respective pair of actuators 136 or 138 at the distal end of a respective support structure 124, 126 will cause the support structure to tilt relative to the vehicular frame 100. With coordinated actuation of the three sets of screw actuators 132, 136, 138, supporting the first 124 and second 126 upper tier vehicle support structures, the vehicle support members can be positioned to form a ramp, as illustrated in FIG. 4, permitting cargo vehicles on the ground to be driven onto the upper tier vehicle support members. Appropriate extension or retraction of the screw actuators 132, 136, 138 can also be used to raise, lower, or tilt the first 124 and second 126 upper tier vehicle support structures to maximize the cargo capacity and minimize the height of the trailer unit 54.

Figure 3:
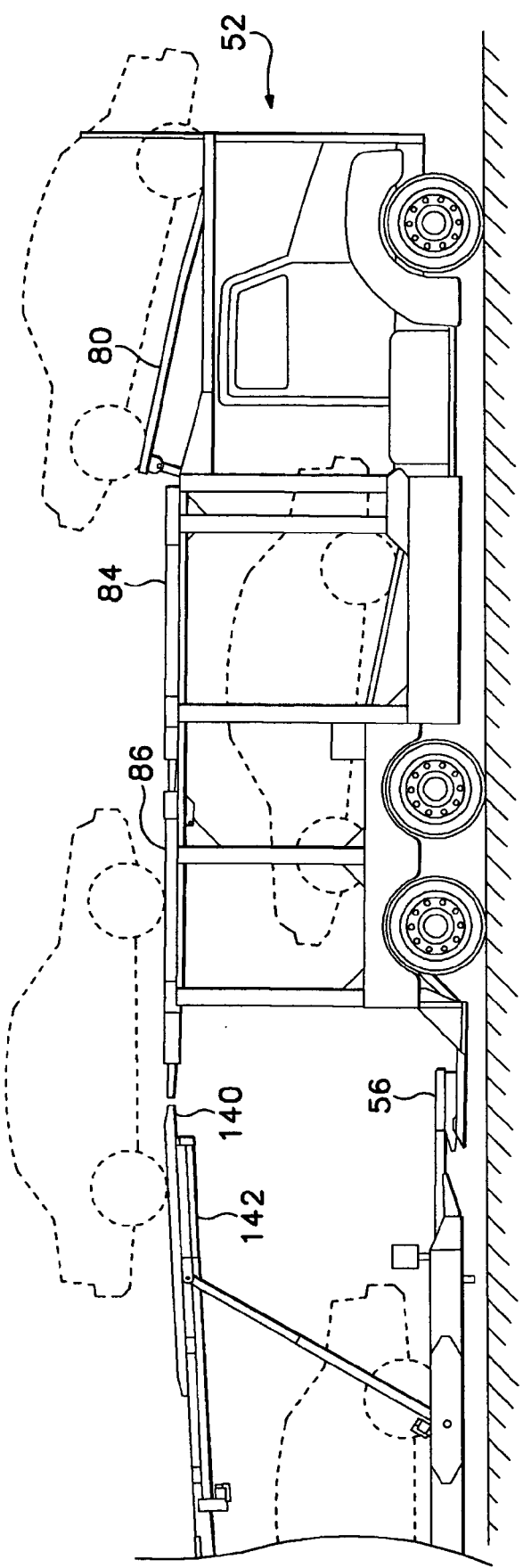
FIG. 3 is a simplified elevation view of the truck unit of FIG. 1A and a portion of the trailer unit of FIG. 1B with an upper tier of vehicle support members positioned to form a ramp from the trailer unit to the truck unit.

When the screw actuators 132, 136, 138 are extended to position the first 124 and second 126 upper tier vehicle support structures to form a ramp for loading and unloading cargo vehicles, the first and second support structures are displaced rearward by motion of the swing arms 130. As illustrated in FIG. 3, a pair of vehicle support members 140, slidably attached to the first upper tier vehicle support structure 124 of the trailer 54, can be extended by a pair of extendible screw actuators 142 to form a slide out ramp to bridge the gap between the first upper tier vehicle support structure of the trailer and the third upper tier vehicle support structure 86 of the truck unit 52 forming a continuous surface for cargo vehicles as they are driven from the ground at the rear of the trailer unit 54 to the first position vehicle support structure 80 at the front of the truck unit.

Referring to FIGS. 5 and 6, the screw actuator 200 is a first embodiment of an extendible screw actuator, such as the actuators 132, 136, 138 supporting the vehicle support members 124 and 126. The screw actuator 200 typically includes a hollow tubular shell 202, having a wall defining an interior and an exterior. The tubular shell 202 is affixed to a mounting 204. The mounting 204 typically includes a bore 206 through which a pin can be inserted to pivotally connect the mounting to a structural member of the trailer, such as the vehicular frame 100, a swing arm 130 or one of the vehicle support members of one of the vehicle support structures, for example vehicle support structure 124. A hollow slide tube 208 having a wall 210 defining a tube interior and an exterior is slidably arranged in the interior of the hollow tubular shell 202. The slide tube 208 also typically has a cross bore 212 to receive a pin to connect the slide tube to another structural member of the vehicular frame, swing arm, or vehicle support member, as appropriate. The extendible actuator 200 is extended by sliding the slide tube 208 out of the tubular shell 202 increasing the length between the bores establishing connection to the appropriate structural members and retracted when the slide tube slides into the tubular shell.

A first end of a screw 214 is supported for thrust and rotation by bearings 216 in the actuator mounting 204. The screw 214 projects along the co-extending centerlines of the tubular shell 202 and the slide tube 208. The distal end of the screw 214 is rotatably supported by a guide 216 that is slidably arranged in the interior of the slide tube 208 and secured by a collar 217. A nut 218, in threaded engagement with the screw 214, is retained in captive engagement at the inner end to the slide tube 208. The nut 218 is constrained against rotation and translates along the screw 214 when the screw is rotated and, as a result of the captive engagement with the slide tube, displaces the slide tube accordingly. Although other thread forms could be used, the screw and the nut typically include an Acme thread which has proportions making the thread desirable for power transmission. The Acme thread preferably has a lead angle less than five degrees preventing the load from back driving the nut 218 on the screw 214. This self-locking screw thread eliminates the need for a braking mechanism on the screw or manual locking pins to sustain the position of the vehicle supporting members after they have been positioned, reducing the time and effort required to load and unload the cargo. Supporting the screw 214 at both ends permits mounting the extendible screw actuator 200 vertically or at any angle to vertical, including horizontal, and substantially increases the ratio of the extended length the actuator to the retracted length by reducing bending and column loading on the screw.

To alter the position of a vehicle support member, such as one of vehicle support structures, the screw 214 is rotated by a motor 220 having a case 222 attached to the actuator mounting 204 and a rotatable shaft 224 connected to drive the screw 214. The driving connection between the shaft 224 and the screw 214 may comprise a linked chain 226 connecting sprockets 228, 230 attached, respectively, to the motor shaft 224 and the screw 214; gears; or another torque transmitting mechanism. The motor 220 is, typically, a hydraulic motor. A hydraulic valve 232 is attached a manifold 233 affixed to the motor's case. The electrical solenoid controlled valve 232 selectively permits or blocks the flow of fluid through at least one motor port to control rotation of the motor 220. However, the motor 220 could be an electric motor or other type of motor capable of generating the torque necessary to rotate the screw 214. Mounting the motor 220 on the screw actuator 200 facilitates the pivoting of the actuator as it is extended and retracted.

A follower nut 234 is threaded on the screw in spaced relation to the nut 218. The follower nut 234 is constrained against rotation and translates along the screw 214 when the screw is rotated. In the event that the nut 218 should fail, the slide tube 208 will retract into the tubular shell 202 until further movement is blocked by the follower nut. The follower nut 234 will support the vehicle support structure or other load until the actuator 200 can be repaired. A mark 209 on the slide tube 208 that is visible until the slide tube is fully retracted and at least one of the nut and the slide tube is in contact the follower nut 218 provides a visible indicator of the need to repair or replace the actuator.

Figure 7:
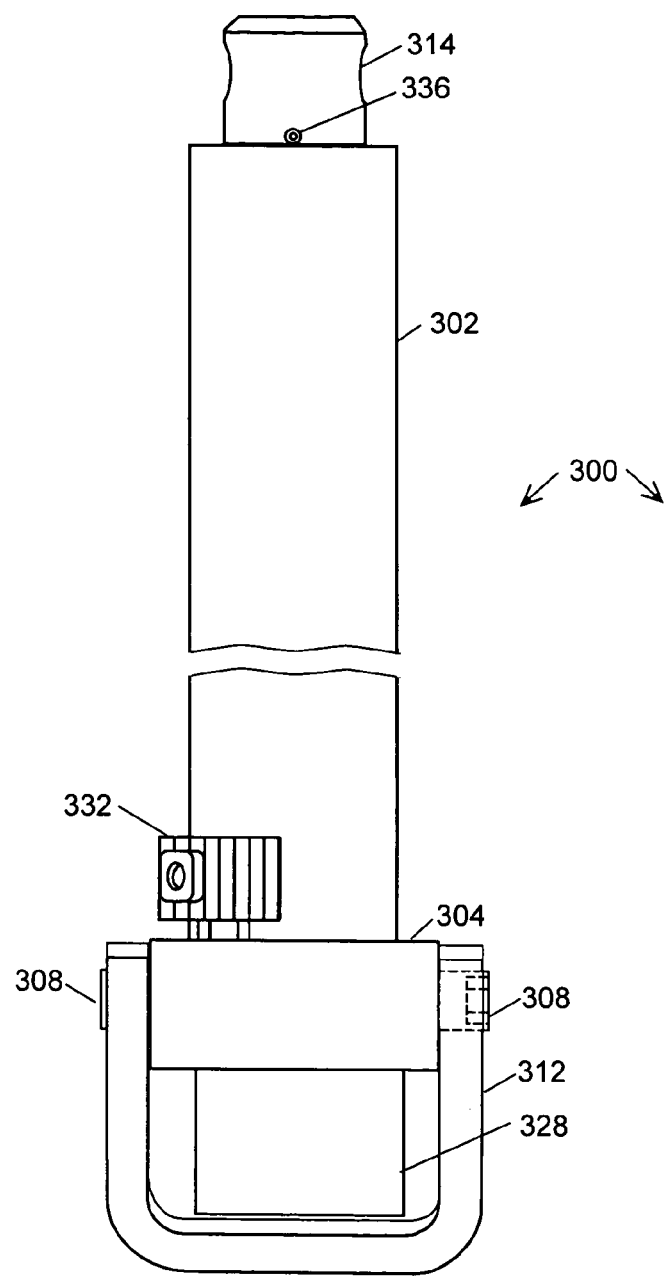
FIG. 7 is a side view of a second embodiment of an extendible screw actuator.
Figure 8:
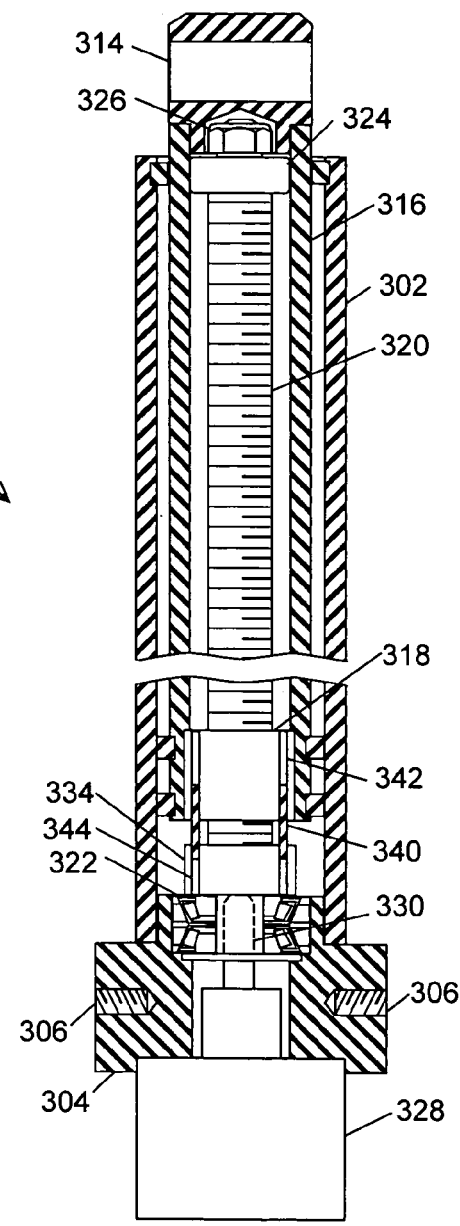
FIG. 8 is a cut-away view of the extendible screw actuator of FIG. 7.

A second embodiment of the extendible screw actuator 300 is illustrated in FIGS. 7 and 8. The actuator 300 includes a hollow tubular shell 302 that is affixed to a mount 304. The mount 304 includes tapped holes 306 to receive screws 308. The round heads of the screws 308 provide a pivoting connection for a cooperating yoke 312, attachable to a member in the transporter' structure. A second member is connectible to the actuator 300 by a pin engaging a cross bore 314 in a slide tube 316 that is arranged to slide in the interior of the tubular shell 302. The slide tube 316 is extended and retracted in the tubular shell 302 by the interaction of screw 320 and a nut 318, in threaded engagement with the screw and in captive engagement with the slide tube. The screw 320 is rotatably supported at one end by bearings 322 arranged in the mount 304 and at the other end by a guide 324 that is slidable in the interior of the slide tube 316. A locking nut 326 retains the guide 324 to the screw 320. The screw 320 is rotated by a hydraulic motor 328 that has a frame that bolted to the base of the mount 304 and a rotatable shaft 330 with an exterior spline that engages a cooperating interior spline in an aperture in the end of the screw 320. A hydraulic valve 332, attached to the mount 304, is connected to a fluid port in the motor 328 by passageways internal to the mount. The valve 332 can selectively block the flow of fluid to or from at least one port in the motor 328 to control rotation of the motor.

A follower nut 334 is threaded onto the screw 320 in a spaced relationship to the nut 318. The follower nut 334 is constrained against rotation by pins 340 inserted in bores 342 and 344 in the nut 318 and the follower nut 334, respectively. If the threads of the nut 318 should fail, the slide tube 316 will retract into tubular shell 302 until it is supported by the follower nut 334. An indicator, such as a mark 336, on the slide tube 316 that is not visible when the slide tube is fully retracted and one of the slide tube and the nut 318 is in contact with the follower nut 334 indicates the need to repair or replace a damaged actuator.

The vehicle support members of the second 84 and third 86 upper tier vehicle support structures of the truck unit 52 include extendible sections 87 to accommodate the varying wheelbases of the various vehicles comprising the cargo of the vehicle transporter 50. Referring to FIG. 9, the vehicle support structures 84, 86 comprise generally a pair of transversely spaced side rails 800 which support sections of the vehicle support members 78. A side rail 800 is arranged proximate to each side of the vehicular frame and movably attached to vertical posts extending upward from the vehicular frame 58. The forward end of the side rail 800 is attached to one of the vertical posts 64, 68 by a pivot 88. The pivot 88 is supported by carrier slidable inside the hollow post 64, 68 and vertically adjustable by movement of the carrier, for example, a nut 802 in threaded engagement with a powered screw 804 of a screw drive. The rearward end of the side rail 800 is supported by a linear actuator enclosed within the appropriate rear post 62, 66. The linear actuator is attached to the side rail 800 by a link 83 that is pivotally attached to the side rail 800 by a pin 806 and to the linear actuator by a pin 808.

The side rail 800 comprises generally a third embodiment of the extendible screw actuator. The outer surface of the side rail 800 comprises a tubular shell 810 having a rectangular, C-shaped cross-section with a longitudinally extending slot in the vertical leg nearest the center of the vehicle. A front mount 812, including provisions for the pivot 88, and a rear mount 814, having an aperture for receiving the link pin 806, are attached to the tubular shell 810.

A hollow slide tube 816 is slidably arranged in the interior of the hollow tubular shell 810. At one end, a screw 818 is supported for thrust and rotation about an axis generally co-extensive with the central axis of the slide tube 816 by bearings 820 arranged in a bearing mount 822 that is retained in the interior of the tubular shell 810 by screws 824. The second end of the screw 818 is rotationally supported by a guide 826 that is slidable in the interior of the slide tube 816 and secured by a locking nut 852. A nut 828, in threaded engagement with the screw 818 and constrained against rotation, is held captive in the interior of the slide tube 816 by retainers 830, 832. As determined by the direction of rotation, when the screw 818 is rotated the nut 828 translates along the screw pushing the slide tube 816 out of the tubular shell 810 or drawing the slide tube into the tubular shell. Sections 834 of a vehicle support member 78 comprise one leg, attached to the slide tube 816 and a slide tube extension 836 welded into the outboard end of the slide tube by hardware, including capscrews 838 that are aligned with the slot in the C-shaped cross-section of the tubular shell 810, and a second normal leg that projects horizontally from the slide tube toward the center of the transporter.

The screw 818 is rotated by a hydraulic motor 840 having a case attached to a motor mount 842 retained in the forward end of the tubular shell 810 by screws 844. The motor 840 includes a rotatable shaft 846 that is coupled to the screw 818 by a coupling 848 having internal splines cooperating with external splines on the motor shaft and the screw. Rotation of the motor shaft 846 is controlled by a hydraulic valve 850 attached to a flange on the motor case. The hydraulic valve is typically actuated by a built-in electric solenoid and selectively permits or blocks the flow of hydraulic fluid to at least one fluid port of the motor.

The vehicle transporter 50 includes a hydraulic supply and control system to provide and control the flow of pressurized fluid to the multiple pairs of laterally spaced actuators used to position support the various vehicle support members. A typical vehicle transporter may include 16 or more pairs of hydraulic actuators arranged along the sides of the transporter. Decentralizing the hydraulic controls, that is, locating the control valve for an actuator closer to the actuator than a control valve controlling another actuator or a control valve controlling the direction of motion of the actuator, and connecting the laterally spaced actuators in parallel permits the hydraulic supply and return conduits to be routed down each side of the vehicular frame of the transporter substantially reducing the number of conduits that must be routed through the frame and the number of potentially leaky connections. As a result, the cost of producing and operating a vehicle transporter can be substantially reduced while the performance is substantially enhanced.

Figure 10:
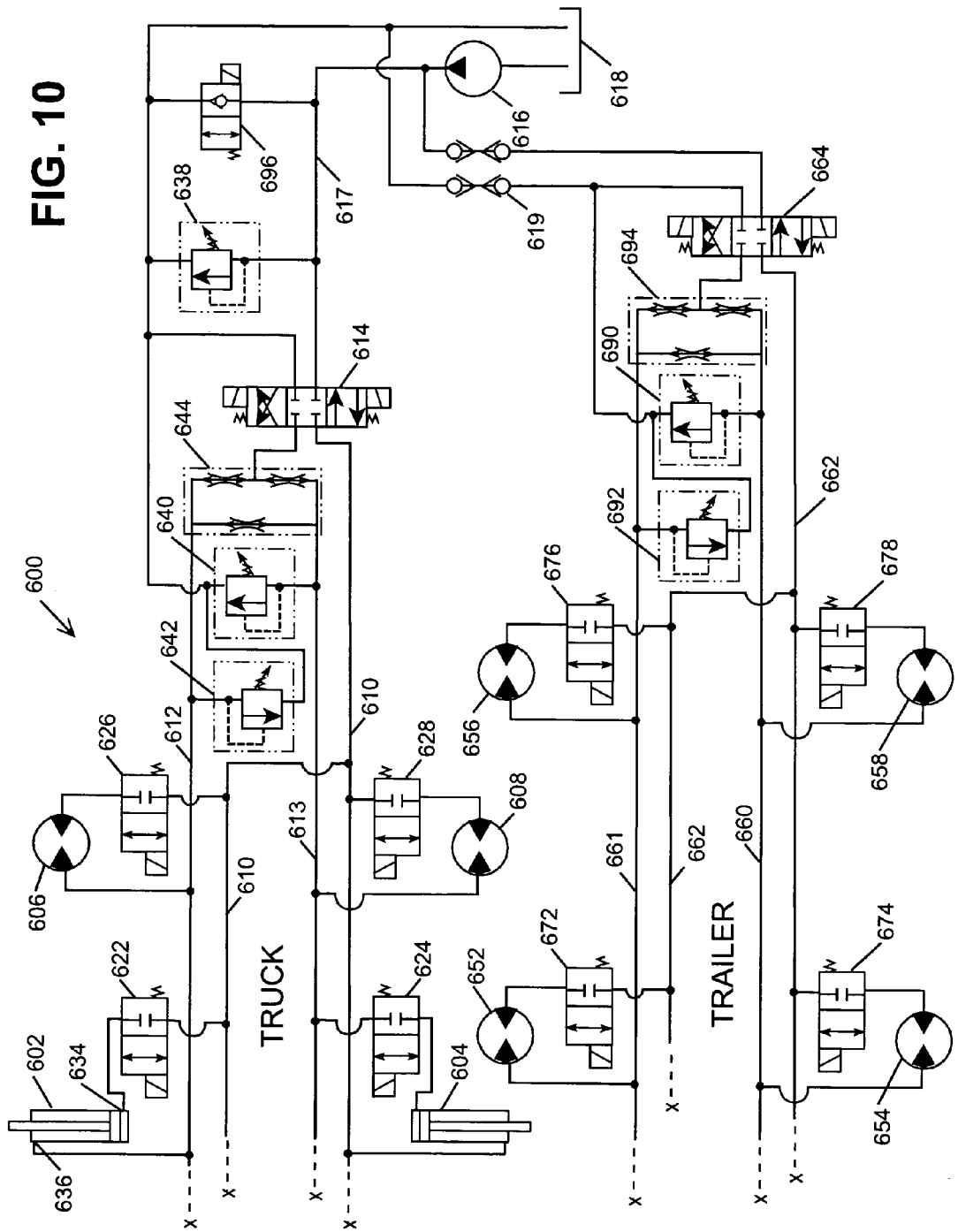
FIG. 10 is a simplified schematic of a first embodiment of a hydraulic system for a vehicle transporter incorporating decentralized controls for a plurality of actuators.

Referring to FIG. 10, a single pump hydraulic supply and control system 600 controls the flow of pressurized fluid to at least two pairs of actuators 602, 604 and 606, 608 used to position vehicle support members of a truck unit and at least two pairs of actuators 652, 654 and 656, 658 used to position vehicle support members of a trailer unit of an exemplary vehicle transporter. While, the hydraulic supply and control system schematically illustrated in FIG. 10 has been simplified for clarity of illustration, a typical vehicle transporter may include 16 or more pairs of hydraulic actuators arranged along the sides of the transporter and connected in parallel to the conduits 610, 612, 613 extending along the edges of the vehicular frame of the truck and 660, 661, 662 extending along the edges of the trailer.

A pump 616 draws fluid from a reservoir 618 and supplies the fluid under pressure to a pressure conduit 617 connectable to the truck fluid conduits 610, 612, 613 and, through quick disconnect fittings 619, to the trailer supply conduits 660, 661, 662. The respective truck 610, 612, 613 and trailer 660, 661, 662 conduits are connectible to at least, two pairs of paired actuators, schematically illustrated, for example, as a pair of hydraulic cylinder assemblies 602, 604 and a pair of hydraulic motors 606, 608 of the truck unit. In a vehicle transporter, the individual actuators, for example cylinders 602 and 604, of a pair of actuators are typically spaced apart transversely at the sides of the vehicular frame and the pairs of actuators are located at different positions longitudinally along the vehicular frame of the truck or the trailer unit of the transporter. The flow of hydraulic fluid to each actuator of a pair of actuators, for examples, actuators 602 and 604 and actuators 606 and 608, is controlled by a respective two position, solenoid operated, actuator hydraulic control valve 622, 624, 626, 628 having a first position selectively blocking the flow of fluid to or from a first port 634 of the respective actuator and a second position selectively permitting fluid to flow between the respective actuator and the conduit 612, 613. Likewise, the actuators 652, 654, 656, 658 of the trailer unit are controlled by respective actuator hydraulic control valves 672, 674, 676, 678. The hydraulic actuator control valves, exemplified by valve 622, are relatively small and inexpensive and are mounted adjacent to the port 634 of the respective actuator, so that each control valve is closer to its respective actuator than an actuator control valve controlling another actuator or a hydraulic valve controlling the direction of movement of the actuator. Typically, as illustrated by example in FIG. 9, the actuator hydraulic control valve 850 is attached to the actuator at or immediately adjacent to one of the fluid ports eliminating a long fluid conduit and potentially leaking connections between the valve and the actuator.

The direction of operation of the multiple hydraulic actuators, for example actuators 602, 604, 606, 608 of the truck unit, is controlled by a three position, four-way, solenoid operated, hydraulic, direction controller valve 614. The direction controller 614 includes a first valve position that blocks flow from the pump 616 and flow to or from the actuators through the conduits 610, 612, 613. A second valve position of the direction controller 614 directs the flow of pressurized fluid from the pump 616 to a pair of parallel fluid conduits 610 connectable to the first port 634 of the actuators 602, 604, 606, 608 through the respective actuator control valves 622, 624, 626, 628 and returns the exhaust flowing from a second port 636 of the respective actuators through the conduits 612, 613 to the reservoir 618. When shifted to a third valve position, the direction controller 614 directs the flow of pressurized fluid from the pump 616 to the second ports 636 of the respective actuators 602, 604, 606, 608 through the conduits 613 and allows any exhaust permitted to flow from the respective first ports 634 of the actuators by the respective actuator hydraulic control valves 622, 624, 626, 628 to return to the reservoir 618 through the parallel conduits 610. The direction of operation of the actuators 652, 654 656, 658 of the trailer unit is controlled in the same manner by the trailer direction control valve 664.

A flow equalizer 644, 694 downstream of the respective truck and trailer direction controllers 614, 664 equalizes the flow of fluid in the parallel conduits 612, 613 and 660, 661, respectively. Adjustable relief valves 638, 640, 642, 690, 692 protect the pump 616, actuators, and actuator control valves from high pressures. A solenoid operated dump valve 696 selectively connects the output of the pump 616 to the reservoir 618.

To actuate a pair of actuators independently of the other pairs of actuators, for example to extend the actuator pair 602, 604, the operator of the vehicle transporter starts a motor driving the pump 616; shifts the direction controller 614 to the second valve position, directing pressurized fluid from the pump to the parallel conduits 610, and shifts the respective actuator control valves 622, 624 to the open position permitting pressurized fluid to enter the shells of the actuators behind the pistons. As the pistons displace the rods of the actuators 602, 604, fluid is displaced through the respective second ports 636 of the actuators and returns to the reservoir 618 through the fluid conduits 612, 613.

Figure 11:
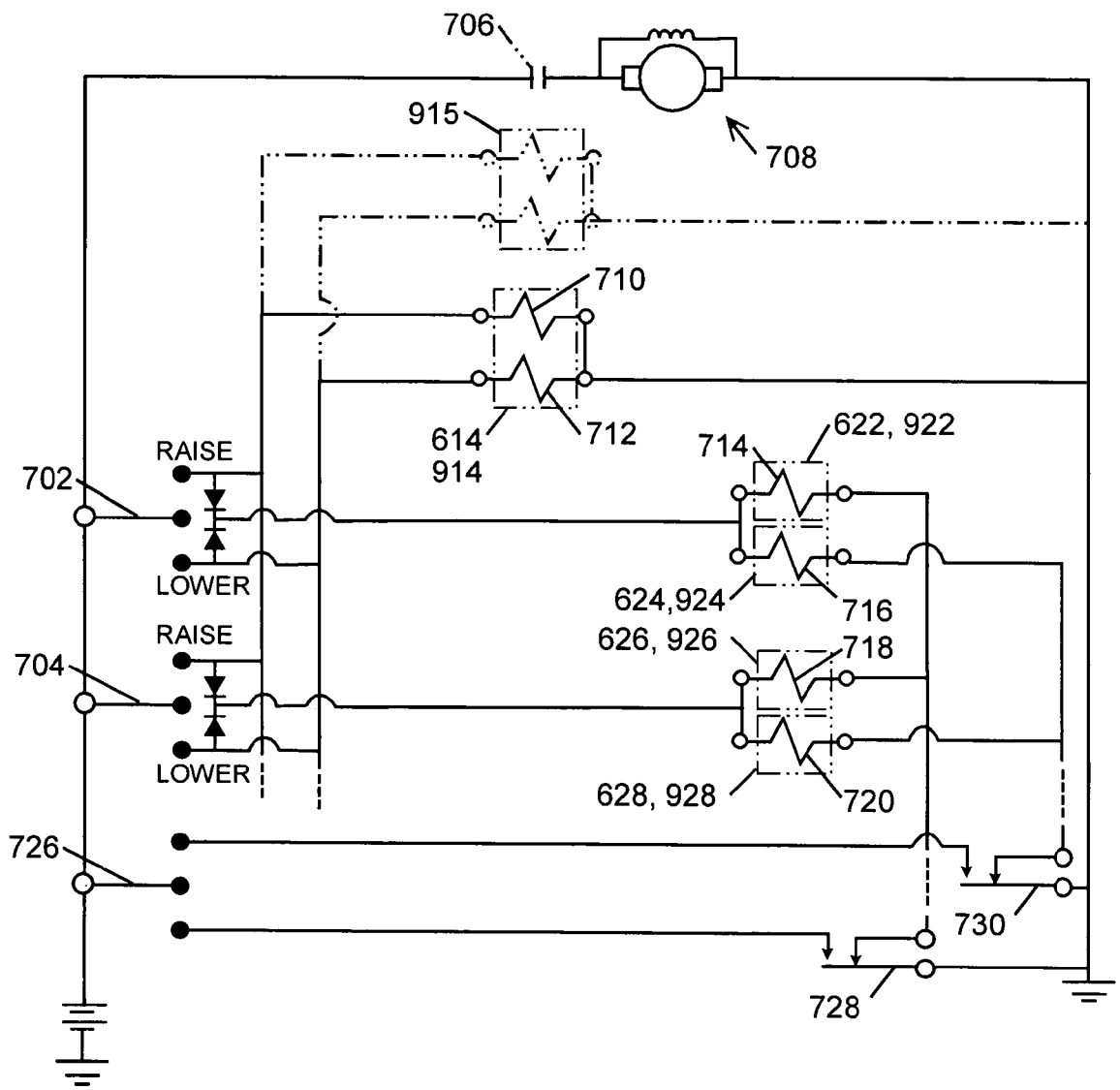
FIG. 11 is a simplified schematic of an electrical system for controlling a hydraulic system including decentralized controls for a plurality of actuators.
Figure 12:
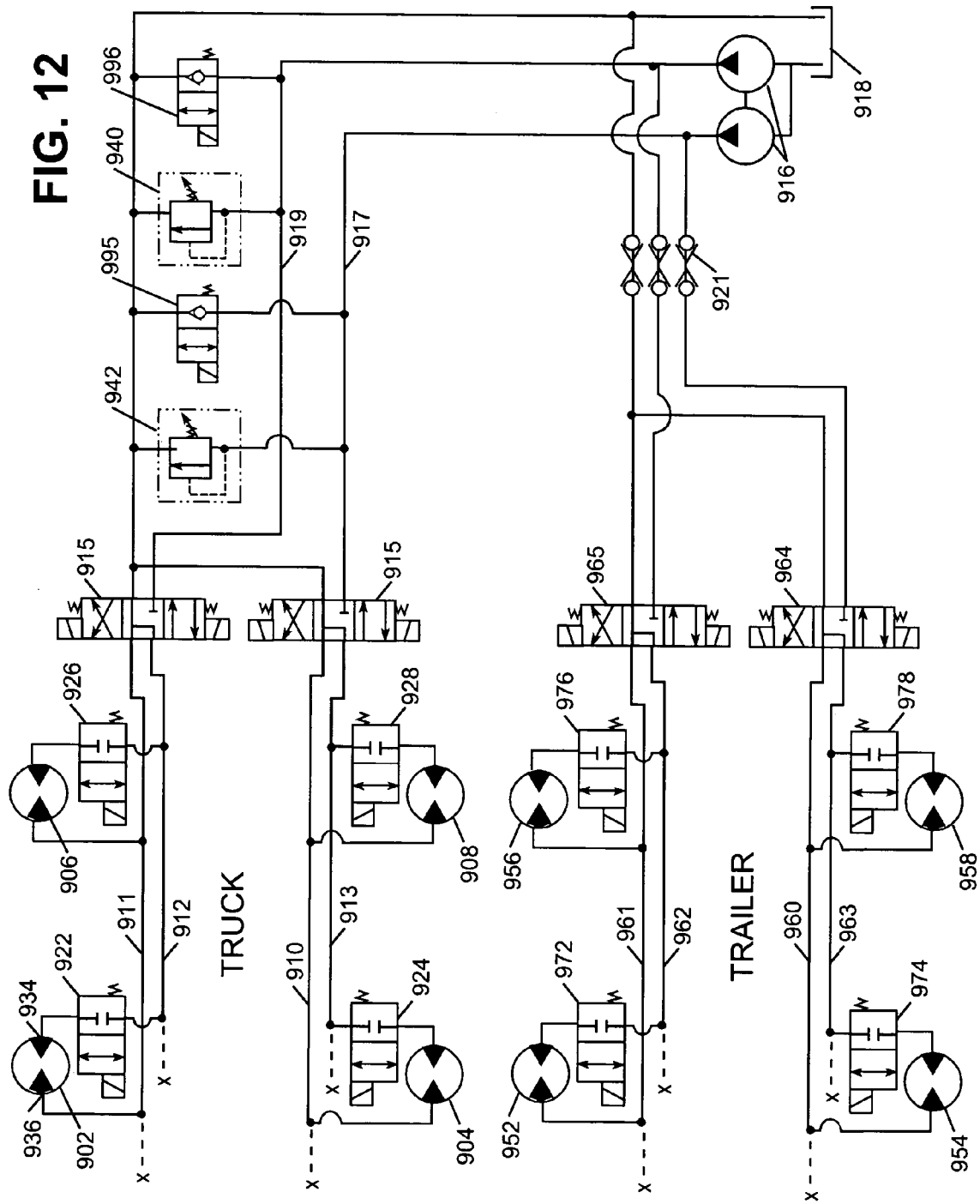
FIG. 12 is a simplified schematic of a second embodiment of a hydraulic system for a vehicle transporter incorporating decentralized controls for a plurality of actuators.

Referring to FIG. 12, in a second embodiment of the hydraulic supply and control system for the actuators of a vehicle transporter, a double pump 619 is utilized to provide equal flows to the actuators arranged along the two sides of the transporter. Like FIG. 11, the hydraulic supply and control system schematically illustrated in FIG. 12 has been simplified for clarity of illustration. The additional actuators of the typical vehicle transporter are connectable in parallel to the conduits 910, 911, 912, 913, 960, 961, 962, 963 extending along the edges of the vehicular frame of the truck and the trailer units, respectively.

The double pump 916 draws fluid from a reservoir 918 and supplies the fluid under pressure to a pair of pressure conduits 917, 919 connectable to the truck fluid conduits 910, 911, 912, 913 and, through quick disconnect fittings 921, to the trailer supply conduits 960, 961, 962, 963. The respective truck 910, 911, 912, 913 and trailer 960, 961, 962, 963 conduits are connectible to at least, two pairs of paired actuators, schematically illustrated, for example, as a two pairs of hydraulic motors 902, 904, 606, 608 of the truck unit. In a vehicle transporter, the individual actuators, for example cylinders 602 and 604, of a pair of actuators are typically spaced apart transversely at the sides of the vehicular frame and the pairs of actuators are located at different positions longitudinally along the vehicular frame of the truck or the trailer unit of the transporter. The flow of hydraulic fluid from the conduits to each actuator of a pair of actuators, for examples, actuators 902 and 904, is controlled by a respective two position, solenoid operated, actuator hydraulic control valve 922, 924 having a first position selectively blocking the flow of fluid to or from a first port 934 of the respective actuator and a second position selectively permitting fluid to flow between the respective actuator and the conduit 911, 913. Likewise, the actuators 952, 954, 956, 958 of the trailer unit are controlled by respective actuator hydraulic control valves 972, 974, 976, 978.

The direction of operation of the multiple hydraulic actuators on one side of the truck or trailer, for example actuators 902 and 906 of the truck unit, is controlled by a respective three position, four-way, solenoid operated, hydraulic, direction controller valve 915. The direction controller 915 includes a first valve position that blocks flow from the pump 916 through the pressure conduit 919 and connects the conduits on one side of the truck 911 and 912 to the reservoir 918. A second valve position of the direction controller 915 directs the flow of pressurized fluid from the pump 916 to the fluid conduit 912 connectable to first port 634 of the actuators 902, 906 on one side of the truck through the respective actuator control valves 922, 926 and returns the exhaust flowing from a second port 936 of the respective actuators through the conduit 911 to the reservoir 918. When shifted to the third valve position, the direction controller 915 directs the flow of pressurized fluid from the pump 916 to the second ports 936 of the respective actuators 902, 906 through the conduit 911 and allows any exhaust permitted to flow from the respective first ports 934 of the actuators by the respective actuator hydraulic control valves 922, 926 to return to the reservoir 918 through the conduits 911. An identical direction control valve 914 controls the direction of operation of the actuators 904, 908 on the second side of the truck unit by selectively connecting pressure from the pump 916 to the conduits 910, 913. Likewise, the direction of operation of the actuators 952, 956 and the actuators 954, 958 arrayed along the sides of the trailer is controlled by the direction control valves 965, 964 which selectively connect pressure and drain to the conduits 961, 962 and the conduits 960, 963.

The adjustable relief valves 940, 942 protect the system from high pressures and the solenoid operated dump valves 995, 996 can selectively connect the output of the pump 616 to the reservoir 618.

Referring to FIG. 11, the operation of the hydraulic supply and control system of the vehicle transporter is controlled electrically. Actuator control switches 702, 704 control respective pairs of actuator hydraulic control valves, for example actuator hydraulic control valves 622, 624 and 626, 628 of the truck unit and the direction controller 614 of the single pump embodiment of the hydraulic control system 600. When the operator is ready to reposition a vehicle support structure of the vehicle transporter, the pump start switch 706 is closed to start the pump motor 708. To extend the pair of actuators 602, 604, the operator moves the actuator control switch 702 to the raise position, energizing the raise solenoid 710 of the direction controller 614 and the solenoids 714, 716 of the respective pair of actuator hydraulic control valves 622, 626 for the transversely spaced pair of elongate hydraulic actuators. The energized raise solenoid 710 of the direction controller 614 shifts the valve to the second valve position directing pressurized through the parallel conduit 610. The energized solenoids 714, 716 of the actuator valves 622, 624 shifts the valves to their open positions, permitting fluid to flow into the actuators 602, 604 extending the rods of the actuators.

To retract the actuators 602, 604, the operator moves the actuator control switch 702 to the lower position energizing the lower solenoid 712 of the direction controller 614 and the actuator control valve solenoids 714, 716 of the actuator control valves 622, 624. The direction controller 614 shifts to the third position and pressurized fluid is directed to the second port 636 of the actuators 602, 604. The energized actuator control valve solenoids 714, 716 shift the actuator control valves 622, 624 to the open position permitting fluid to flow out of the first port 634 and back to the reservoir 618 through the parallel conduits 610. Operating the actuator control switch 704 will produce comparable operation of the direction controller 614 and by energizing the solenoids 718, 720 of the actuator hydraulic control valves 626, 628 produce comparable movement of the respective actuators 606, 608.

In the double pump hydraulic supply and control system 900, actuation of actuator switches 702, 704 energizes the solenoids of the two parallel direction control valves 915 and 914 of the truck unit and the appropriate actuator control valves solenoids 714, 716, 718, 720 controlling the actuator control valves 922, 924, 926, 928. Operation of the actuators of the trailer units is controlled in the same manner.

Since the actuators, for example 602, 604, of each transversely spaced pair are connected in parallel, the actuator experiencing the lowest pressure will extend first and fastest. By way of examples, differences in the seals of the individual actuators, differences in the friction at the spaced-apart pivots of a vehicle supporting structure, binding due to uneven extension of actuators connected to a vehicle supporting structure, or side-to-side variation in the weight of a supported vehicle can cause a pressure differential in the paired actuators. The hydraulic supply and control system 600, 900 includes a displacement equalizer operably interposed between the direction controller 614 and the actuator control valves 622, 624, 626, 628 to permit the operator to equalize flow between the actuators of a pair of actuators, for example, actuators 602 and 604. If the operator selects the raise operation at the actuator control switch 702 the direction controller 710, and actuator control valve solenoids 714, 716 are energized as described above causing the actuators 602, 604 to extend. If the operator detects that a first actuator, for example actuator 602, controlled by the actuator control valve 622 that is operated by the actuator control valve solenoid 714, is moving faster than its paired second actuator 604, the operator can move a flow equalizer switch 726, schematically to the downward, to open the normally closed relay 728, de-energizing the solenoid 714 causing the spring loaded actuator control valve 622, to shift and block flow to the actuator 602. Since the solenoid 716 of the actuator control valve 624 remains energized, the actuator 604 will continue to extend. When the operator returns the flow equalizer switch 726 to the center position, the relay 728 will close, re-energizing the solenoid 714 causing fluid to flow again to both actuators 602, 604. On the other hand, if the solenoids 718, 720 have been actuated by the operator, moving the flow equalizer switch 726 schematically downward will cause the relay 728 to open deactivating solenoid 718. Moving the flow equalizer switch 726 schematically to upward, opens the normally closed relay 730 to deenergize either the solenoid 716 or the solenoid 720 blocking flow to the actuator. The flow equalizer switch 726 will interrupt the operation of any actuator on a respective side of the vehicular frame selected by the operator.

In the double pump hydraulic supply and control system 900 displacement equalization can be accomplished in the same manner. In addition, since flow from the pump to each side of the truck or trailer unit flows through a unique passage, displacement could be equalized by selectively de-energizing the solenoids of the appropriate one of the direction control valves 914, 915 or 964, 965 or energizing the appropriate dump valve 995 or 996 to interrupt flow to one side of the transporter.

The decentralized hydraulic controls provide flexible control of the multiple hydraulic actuators of the typical vehicle transporter while substantially reducing the cost of the transporter and the number of potential leak points in the hydraulic system. The self-locking screw actuators speed the loading and unloading of the vehicular transporter by eliminating the manual insertion or removal of locking pins at each of the actuators supporting the vehicle support members. The screw actuator can be conveniently connected to the structure of the vehicle transporter and used in any orientation facilitating its use to position vehicle supporting members that translate and tilt. Enclosing the screw and nut of the provides good protection from dirt and moisture in the over-the-road environment.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A vehicle transporter comprising:
   (a) a vehicular frame;
   (b) a vehicle support member movable relative to said vehicular frame; and
   (c) a screw actuator comprising:
      (i) an elongate tubular shell connectible to one of said vehicular frame and said vehicle support member, said tubular shell comprising a wall defining an exterior and an interior;
      (ii) an elongate slide tube having a first end connectible to the other of said vehicular frame and said vehicle support member, a second end, and a slide tube wall connecting said first end and said second end and defining a slide tube interior and a slide tube exterior, said slide tube exterior being slidably arranged in said interior of said tubular shell;
      (iii) a guide in sliding engagement with said slide tube interior;
      (iv) a screw having a threaded portion, a first end arranged for rotation in said interior of said tubular shell, and a second end rotatably supported by said guide; and
      (v) a nut constrained to translate with said slide tube and in threaded engagement with said threaded portion of said screw so that rotation of said screw will cause said slide tube to translate longitudinally in said tubular shell altering said length of said screw actuator and moving said vehicle support member relative to said vehicular frame.

2. The vehicle transporter of claim 1 wherein said screw actuator further comprises a follower nut in threaded engagement with said screw and in sliding engagement with said interior of said tubular shell.

3. The vehicle transporter of claim 1 wherein said screw actuator further comprises a motor including a frame connected to said tubular shell and a shaft rotatable in said frame and drivingly connected to rotate said screw.

4. The vehicle transporter of claim 1 wherein said threaded portion of said screw is arranged so that said threaded engagement of said nut and said screw is self-locking to prevent forces tending to translate said slide tube from causing rotation of said screw.

5. The vehicle transporter of claim 1 wherein said threaded portion of said screw comprises an Acme thread having a lead angle not exceeding five degrees.

6. The vehicle transporter of claim 1 wherein at least one of said tubular shell and said slide tube is connectible to one of said vehicular frame and said vehicle support member by a pivotal connection.

7. The vehicle transporter of claim 6 wherein said screw actuator further comprises a follower nut in threaded engagement with said screw and in sliding engagement with said interior of said tubular shell.

8. The vehicle transporter of claim 6 wherein said screw actuator further comprises a motor including a frame attached to said tubular shell and a shaft rotatable in said frame and drivingly connected to rotate said screw.

9. The vehicle transporter of claim 8 wherein said tubular shell is connectible to one of said vehicular frame and said vehicle support member with a pivoting connection enabling said motor and said tubular shell to pivot in unison.

10. The vehicle transporter of claim 6 wherein said threaded portion of said screw is arranged so that said threaded engagement of said nut and said screw is self-locking to prevent forces tending to translate said slide tube from causing rotation of said screw.

11. A vehicle transporter comprising:
    (a) a vehicular frame;
    (b) a vehicle support member having a pivotally supported first end and a second end; and
    (c) a screw actuator comprising:
       (i) an elongate tubular shell pivotally connectible to one of said vehicular frame and said vehicle support member, said tubular shell comprising a wall defining an exterior and an interior;
       (ii) an elongate slide tube having a first end, said first end having a pivotal connection to the other of said vehicular frame and said vehicle support member; a second end; and a slide tube wall connecting said first end and said second end and defining a slide tube interior and a slide tube exterior, said slide tube exterior being slidably arranged in said interior of said tubular shell;
       (iii) a guide in sliding engagement with said slide tube interior;
       (iv) a screw having a threaded portion, a first end arranged for rotation in said interior of said tubular shell, and a second end rotatably supported by said guide; and
       (v) a nut constrained to translate with said slide tube and in threaded engagement with said threaded portion of said screw so that rotation of said screw will cause said slide tube to translate longitudinally in said tubular shell altering said length of said screw actuator and moving at least said second end of said vehicle support member.

12. The vehicle transporter of claim 11 wherein said screw actuator further comprises a follower nut in threaded engagement with said screw and in slidable relative to said interior of said tubular shell.

13. The vehicle transporter of claim 11 wherein said screw actuator further comprises a motor including a frame attached to said tubular shell and a shaft rotatable in said frame and drivingly connected to rotate said screw.

14. The vehicle transporter of claim 11 wherein said threaded portion of said screw is arranged so that said threaded engagement of said nut and said screw is self-locking to prevent forces tending to translate said slide tube from causing rotation of said screw.

15. A vehicle transporter comprising:
    (a) a vehicular frame;
    (b) a first vehicle support member supported by said vehicular frame and selectively movable relative to said vehicular frame; and
    (c) a plurality of screw actuators, each comprising:

(i) an elongate tubular shell comprising a wall defining an shell exterior and a shell interior, said tubular shell having a pivoting connection to at least one of said vehicular frame and said vehicle support member;

(ii) a slide tube having a first end, said first end having a pivotal connection to the other of said vehicular frame and said vehicle support member; a second end; and a slide tube wall connecting said first end and said second end and defining a slide tube interior and a slide tube exterior, said slide tube exterior being arranged to slide within said shell interior;

(iii) a guide in sliding engagement with said slide tube interior;

(iv) a screw including a threaded portion, a first end rotatably supported for rotation of said screw in said shell interior, and a second end rotatably supported by said guide;

(v) a nut restrained to said slide tube and in threaded engagement with said threaded portion of said screw so that rotation of said screw will cause said slide tube to translate in said tubular shell altering a dimension between said connection of said first end of said slide tube and said connection of said tubular shell causing said first vehicle support member to move relative to said vehicular frame;

(vi) a follower nut in threaded engagement with said screw and slidably bearing on said shell interior; and (vi) a hydraulic motor having a frame attached to said tubular shell and a shaft selectively rotatable in said frame and drivingly connected to said screw.

16. The vehicle transporter of claim 15 further comprising:

(a) a second vehicle support member pivotally attached at a first end to said first vehicle support member; and (b) an additional screw actuator comprising an additional screw, a first pivoting connection to said vehicular frame, a second pivoting connection to said second vehicle support member, and elongate members that slide longitudinally relative to each other in response to rotation of said additional screw to selectively vary a length between said first and said second connections causing said second vehicle support member to pivot about said first end, rotation of said additional screw forcing said elongate members to slide longitudinally relative to each other.

17. The vehicle transporter of claim 15 further comprising:

(a) a second vehicle support member slidably attached to said first vehicle support member; and (b) an additional screw actuator comprising an additional screw, a first connection to said first vehicle support member, a second connection to said second vehicle support member, and elongate members that slide longitudinally relative to each other in response to rotation of said additional screw to selectively vary a length between said first and said second connections causing said second vehicle support member to translate relative to said first vehicle support member, rotation of said additional screw forcing said elongate members to slide longitudinally relative to each other.

18. A screw actuator comprising:

(a) a tubular shell connectible to a first member; said tubular shell comprising a wall defining an exterior and an interior;

(b) a slide tube having a first end, a second end, and a slide tube wall connecting said first end and said second end and defining a slide tube interior and a slide tube exterior, said slide tube exterior being slidably arranged in said interior of said tubular shell, said slide tube connectible to a second member;

(c) a guide in sliding engagement with said slide tube interior;

(d) a screw having a threaded portion and a first end rotationally supported by said guide, said screw arranged for rotation in said interior of said tubular shell; and (e) a nut in threaded engagement with said threaded portion of said screw and constrained to translate with said slide tube so that rotation of said screw will cause said slide tube to translate in said tubular shell altering a length of said screw actuator.

19. The screw actuator of claim 18 further comprising a follower nut in threaded engagement with said screw and spaced apart from said nut.

20. The screw actuator of claim 19 further comprising an indicator of contact between said follower nut and at least one of said nut and said slide tube.

21. The screw actuator of claim 18 further comprising a motor including a frame connected to said tubular shell and a shaft rotatable in said frame and drivingly connected to rotate said screw.

22. The screw actuator of claim 18 wherein said threaded portion of said screw is arranged so that a force tending to displace said slide tube will not cause rotation of said screw.

23. The screw actuator of claim 18 wherein said threaded portion of said screw comprises an Acme thread having a lead angle not exceeding five degrees.

24. The screw actuator of claim 18 wherein at least one of said tubular shell and said slide tube is pivotally connectible, respectively, to one of said first member and said second member.

25. The screw actuator of claim 24 further comprising a follower nut in threaded engagement with said screw and spaced apart from said nut.

26. The screw actuator of claim 18 further comprising:

(a) a hydraulic motor comprising a frame attached to said tubular shell, said frame including a fluid port, and a shaft rotatable in said frame and drivingly connected to rotate said screw, said shaft rotatable by pressurized fluid at said fluid port; and (b) a hydraulic valve attached to one of said tubular shell and said frame of said hydraulic motor and connected to selectively block a flow of fluid to said fluid port.

27. A vehicle transporter comprising:

(a) a vehicular frame;

(b) a vehicle support member movable relative to said vehicular frame;

(c) a screw actuator pivotally connected to said vehicular frame and said vehicle support member and having first and second elongate members that slide longitudinally relative to each other in response to rotation of a screw so as to alter a length of said actuator causing said vehicle support member to move relative to said vehicular frame; and (d) a motor having a motor frame connected to said first elongate member of said screw actuator and movable in unison with said first elongate member and a motor shaft rotatable in said motor frame and drivingly connected to rotate said screw.

28. A screw actuator comprising:

(a) a tubular shell movably connectible to a first member; said tubular shell comprising a wall defining an exterior and an interior;

(b) a slide tube having a first end, a second end, and a slide tube wall connecting said first end and said second end and defining a slide tube interior and a slide tube exterior, said slide tube exterior being slidably arranged in said interior of said tubular shell, said slide tube connectible to a second member;

(c) a screw arranged for rotation in said interior of said tubular shell;

(d) a nut in threaded engagement with said screw and constrained to translate with said slide tube so that rotation of said screw will cause said slide tube to translate slidably in said tubular shell altering a length of said actuator; and (e) a motor having a motor frame attached to said tubular shell and movable in unison with said tubular shell, and a motor shaft rotatable in said motor frame and drivingly connected to rotate said screw.

29. A vehicle transporter comprising:

(a) a vehicular frame;

(b) a vehicle support member movable relative to said vehicular frame;

(c) a screw actuator having elongate members that slide longitudinally relative to each other in response to turning of a screw so as to alter a length of said actuator, and having a connection to said vehicular frame and a connection to said vehicle support member so that altering said length of said screw actuator will cause said vehicle support member to move relative to said vehicular frame, rotation of said screw forcing said elongate members to slide longitudinally relative to each other; and (d) a motor including a motor frame and a motor shaft rotatable in said motor frame and drivingly connected to rotate said screw, said screw and said motor shaft rotatable on a common axis.

* * * * *

UNITED STATES PATENT AND TRADEMARK OFFICE
CERTIFICATE OF CORRECTION

| | |
|---|---|
| PATENT NO. | : 7,025,547 B2 |
| APPLICATION NO. | : 10/812748 |
| DATED | : April 11, 2006 |
| INVENTOR(S) | : Boydstun IV et al. |

It is certified that error appears in the above-identified patent and that said Letters Patent is hereby corrected as shown below:

Column 2
Line 66, change "elevation view of a extendible" to -- elevation view of an extendible --

Column 4
Line 14, change "screw 802" to -- screw 804 --

Column 7
Line 59, change "supported by carrier slidable" to -- supported by a carrier slidable --

Column 8
Line 45, change "to position support" to -- to position and support --

Column 10
Line 23, change "pump 619" to -- pump 916 --

Column 10
Line 40, change "motors 902, 904, 606, 608" to -- motors 902, 904, 906, 908 --

Column 11
Line 1-2, change "connectable to first port 634" to -- connectable to a first port 934--

Column 11
Line 24, change "pump 616" to -- pump 916 --

Column 11
Line 25, change "reservoir 618" to -- reservoir 918 --

UNITED STATES PATENT AND TRADEMARK OFFICE
CERTIFICATE OF CORRECTION

PATENT NO. : 7,025,547 B2
APPLICATION NO. : 10/812748
DATED : April 11, 2006
INVENTOR(S) : Boydstun IV et al.

It is certified that error appears in the above-identified patent and that said Letters Patent is hereby corrected as shown below:

<u>Column 12</u>
Line 27, change "schematically to the downward" to -- schematically downward --

Signed and Sealed this

First Day of August, 2006

JON W. DUDAS
*Director of the United States Patent and Trademark Office*